United States Patent
Tokuyasu et al.

(10) Patent No.: US 6,861,452 B2
(45) Date of Patent: Mar. 1, 2005

(54) COMPOSITION FOR PRODUCTION OF FLAME-RETARDANT FLEXIBLE POLYURETHANE FOAMS

(75) Inventors: Noriaki Tokuyasu, Tokai (JP); Katsumi Kameda, Aichi (JP)

(73) Assignee: Daichi Chemical Industry Co., Ltd., Osaka (JP)

(*) Notice: Subject to any disclaimer, the term of this patent is extended or adjusted under 35 U.S.C. 154(b) by 0 days.

(21) Appl. No.: 10/486,540

(22) PCT Filed: Aug. 20, 2002

(86) PCT No.: PCT/JP02/08361

§ 371 (c)(1),
(2), (4) Date: Feb. 9, 2004

(87) PCT Pub. No.: WO03/020785

PCT Pub. Date: Mar. 13, 2003

(65) Prior Publication Data

US 2004/0204511 A1 Oct. 14, 2004

(30) Foreign Application Priority Data

Aug. 31, 2001 (JP) ......................... 2001-264165

(51) Int. Cl.⁷ ............................................... C08G 18/28
(52) U.S. Cl. ..................... 521/107; 521/114; 521/117; 521/129; 521/130; 521/131; 521/168; 521/169; 521/170; 521/174
(58) Field of Search ................ 521/107, 114, 521/117, 129, 130, 131, 168, 169, 170, 174

(56) References Cited

U.S. PATENT DOCUMENTS

| | | | |
|---|---|---|---|
| 5,350,777 A | * | 9/1994 | Yuge et al. .................. 521/117 |
| 5,608,100 A | | 3/1997 | Sicken |
| 5,958,993 A | * | 9/1999 | Blundell et al. ............. 521/168 |
| 6,127,464 A | * | 10/2000 | Tokuyasu et al. ........... 524/117 |
| 6,262,135 B1 | * | 7/2001 | Bradford et al. ............ 521/107 |
| 6,380,273 B1 | * | 4/2002 | Eilbracht et al. ........... 521/108 |
| 6,734,239 B1 | * | 5/2004 | Tokuyasu et al. ........... 524/116 |

FOREIGN PATENT DOCUMENTS

| | | |
|---|---|---|
| DE | 0 908 464 A | 4/1999 |
| EP | 0 989 146 A1 | 3/2000 |
| EP | 1 061 095 A1 | 12/2000 |
| GB | 1 489 819 A | 10/1996 |
| JP | 2001-151919 | 6/2001 |

* cited by examiner

Primary Examiner—John M. Cooney, Jr.
(74) Attorney, Agent, or Firm—Knobbe, Martens, Olson & Bear LLP

(57) ABSTRACT

The present invention provides a composition for flame-retardant flexible polyurethane foam comprising: (i) a polyol component; (ii) a polyisocyanate component; (iii) a halogen-free phosphate ester that meets the following conditions (a) to (d), and that contains at least one alcoholic hydroxyl group: (a) an acid value of 2 KOHmg/g or less, (b) a viscosity of 5 Pa·s or less at 25° C., (c) a hydroxyl value of 5 to 250 KOHmg/g, and (d) a weight average molecular weight of 200 to 2000; (iv) a tertiary amine carboxylate; (v) a silicone foam stabilizer; and (vi) a blowing agent. The composition for flame-retardant flexible polyurethane foam of the present invention can give a flexible polyurethane foam that has satisfactory flame retardant properties, as well as excellent properties such as better heat resistance, fogging resistance and scorch resistance and extremely low compression strain.

7 Claims, No Drawings

COMPOSITION FOR PRODUCTION OF FLAME-RETARDANT FLEXIBLE POLYURETHANE FOAMS

This application is the U.S. National Phase under 35 U.S.C. §371 of International Application PCT/JP02/08361, filed on Aug. 20, 2002, which claims priority of Japanese Patent Application Nos. 2001-264165, filed on Aug. 31, 2001. The International Application was published under PCT Article 21(2) in a language other than English.

TECHNICAL FIELD

The present invention relates to a composition for flame-retardant flexible polyurethane foam.

BACKGROUND ART

Polyurethane resins, which are typical of thermosetting resins, are relatively inexpensive and are easy to mold, and the foamed products thereof are widely used over the entire range of articles of daily use, including automotive parts. However, polyurethane resins are flammable, and once they ignite, they have a major drawback of carrying out uncontrollable combustion. Various efforts have thus been made to produce flame-retardant polyurethane foam. Nowadays, flame retardance is legally compulsory in some fields featuring the use of polyurethane, such as automotive interiors.

Generally, in order to impart flame retardancy to polyurethane, the method of adding a halogen-containing phosphate ester as a flame retardant is adopted. Additive-type flame retardants of halogen-containing monomeric phosphate ester are usually used, such as tris(chloroethyl) phosphate and tris(chloropropyl) phosphate. However, these flame retardants tend to be vaporized at high temperature due to their low molecular weight. When the polyurethane foam containing such a flame retardant is used for automotive sheet and the like, as the temperature inside the automobile increases in summer or under similar high-temperature conditions, a phenomenon of fogging tends to occur in which phosphate components, amine catalysts contained in the starting materials, or salts of amine with hydrogen halides produced by the decomposition of the phosphate components are vaporized or scattered inside the automobile and the glass of the automobile becomes cloudy. Further, the flame retardant property of the foamed product is sometimes impaired. The vaporized or scattered materials also pose the risk of adversely affecting humans.

A method that has thus been proposed in order to reduce the amount of flame retardants which are vaporized is to use additive-type flame retardants of halogen-containing condensed phosphate oligomer. However, monomer components generally remain in an amount of about 5 to 20 wt % in oligomer types of flame retardants, so even when oligomer types of flame retardants are used, the problem of the flame retardant becoming vaporized at elevated temperatures cannot still be overcome due to the presence of such low molecular weight components.

Other known flame retardants are additive-type flame retardants of halogen-containing highly condensed phosphate esters in which the phosphate esters are condensed to a higher degree in order to minimize the amount of residual monomer components. However, such highly condensed phosphate esters have poor workability because of their high viscosity, and tend to decompose, resulting in the formation of hydrogen halide salts of amines, with the risk of scattering and adverse effects on other physical properties such as scorch resistance.

Furthermore, the aforementioned types of flame retardants all contain halogens, and there is concern that their vaporization might affect humans and they produce dioxins when burned.

Although the use of additive-type flame retardants of halogen-free phosphate ester could overcome problems such as the formation of hydrogen halide salts of amines and the production of dioxins when burned, the vaporization of the phosphate esters itself cannot be prevented.

Methods that have thus been studied include preventing flame retardants from being vaporized by using flame retardants with reactive functional groups, referred to as reactive flame retardants, which are incorporated into the resin skeleton of the polyurethane foam by reacting with starting materials.

The polyurethane foam is formed by the reaction between isocyanate groups of a polyisocyanate and two types of hydroxyl groups, i.e. hydroxyl groups in the polyol and hydroxyl groups in water serving as the blowing agent. However, when reactive flame retardants of phosphate ester containing reactive functional groups are used, it is necessary to control the reaction between the isocyanate groups and three different types of reactive functional groups, making it difficult to fully satisfy the intended properties of foamed product in the conventional manner.

Japanese Unexamined Patent Publication No. 2001-11302, for example, describes a method in which a reactive type of phosphate ester containing alcoholic hydroxyl groups is used to produce a flame-retardant flexible polyurethane foam. Japanese Unexamined Patent Publication No. 2001-151919 describes a method in which both a reactive type of phosphate ester containing alcoholic hydroxyl groups and an additive type of oligomeric phosphate ester are used to produce a flame-retardant flexible polyurethane foam with good flame laminate property. In these methods, however, it is difficult to achieve the well-balanced reaction between the three types of hydroxyl groups and the isocyanate groups. Thus, open cells cannot be formed by simply varying the amount of the reactive phosphate ester and a closed cell foam tends to be formed, resulting in the low air permeability and the high compressive strain of the foamed product.

DISCLOSURE OF THE INVENTION

A primary object of the present invention is to provide a composition for polyurethane foam capable of overcoming the drawbacks described above, that is, a composition for polyurethane foam containing a reactive-type flame retardant of halogen-free phosphate ester, which composition is capable of forming a flame-retardant flexible polyurethane foam with outstanding characteristics such as better flame retardant properties, excellent resistance to scorch and fogging, and lower compressive strain.

As a result of extensive research to overcome the drawbacks described above, the inventors accomplished the present invention upon finding that a flame-retardant flexible polyurethane foam with excellent flame retardant properties, resistance to scorch and fogging, and lower compressive strain can be obtained by using a specific halogen-free phosphate ester containing reactive functional groups as a flame retardant in combination with a salt of a tertiary amine compound with a carboxylic acid.

Specifically, the present invention provides the following compositions for polyurethane foam.

1. A composition for flame-retardant flexible polyurethane foam comprising:
 (i) a polyol component;
 (ii) a polyisocyanate component;
 (iii) a halogen-free phosphate ester that meets the following conditions (a) to (d), and that contains at least one alcoholic hydroxyl group;
  (a) an acid value of 2 KOHmg/g or less, (b) a viscosity of 5 Pa·s or less at 25° C., (c) a hydroxyl value of 5 to 250 KOHmg/g, and (d) a weight average molecular weight of 200 to 2000;

(iv) a tertiary amine carboxylate;

(v) a silicone foam-stabilizer; and (vi) a blowing agent.

2. A composition for flame-retardant flexible polyurethane foam according to the above item 1, which comprising 1 to 20 parts by weight of the phosphate ester specified in item (iii), 0.01 to 0.3 part by weight of the tertiary amine carboxylate, 0.5 to 2 parts by weight of the silicone foam stabilizer and 0.1 to 40 parts by weight of the blowing agent, per 100 parts by weight of the polyol component.

3. A composition for flame-retardant flexible polyurethane foam according to the above item 1 or 2, wherein the tertiary amine carboxylate is a salt of aliphatic tertiary amine with carboxylic acid.

4. A composition for flame-retardant flexible polyurethane foam according to any one of the above items 1 to 3, wherein the phosphate ester specified in item (iii) is a compound represented by the following formula (I):

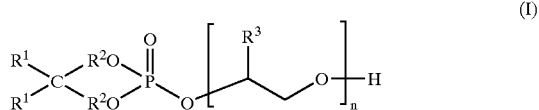

wherein $R^1$ is a $C_1$ to $C_4$ alkyl group, $R^2$ is a $C_1$ to $C_3$ alkylene group, $R^3$ is a $C_1$ to $C_3$ alkyl group, and n is an integer of 1 to 10.

The composition for flame-retardant polyurethane foam of the present invention comprises the following components (i) to (vi) as essential components:

(i) a polyol component;

(ii) a polyisocyanate component;

(iii) a halogen-free phosphate ester that meets the following conditions (a) to (d), and that contains at least one alcoholic hydroxyl group;

(a) an acid value of 2 KOHmg/g or less, (b) a viscosity of 5 Pa·s or less at 25° C., (c) a hydroxyl value of 5 to 250 KOHmg/g, and (d) a weight average-molecular weight of 200 to 2000;

(iv) a tertiary amine carboxylate;

(v) a silicone foam stabilizer; and (vi) a blowing agent.

The individual components contained in the composition for polyurethane foam of the present invention are described below.

(i) Polyol Component

Examples of polyol components which can be used include polyol components commonly used in the production of flexible polyurethane foam, such as polyether polyols, polyester polyols and polymer polyols.

Examples of polyether polyols among these include polyether polyols with a hydroxyl value of about 25 to 70 KOHmg/g, which are obtained by the random or block addition of alkylene oxides such as ethylene oxide and propylene oxide to polyfunctional polyols, amine compounds or the like. Examples of polyfunctional polyols include glycols such as ethylene glycol and propylene glycol; triols such as glycerol and trimethylolpropane; polyols such as pentaerythritol, sorbitol and sucrose. Examples of amine compounds include ammonia, triethanolamine, ethylene diamine, diethylene triamine, aminoethyl piperazine and aniline.

Polyester polyols are compounds having terminal hydroxyl groups obtained by the polycondensation of polyfunctional carboxylic acids and polyfunctional hydroxyl compounds, preferably with a number average molecular weight of about 500 to 10,000, and more preferably about 1000 to 5000. Examples of polyfunctional carboxylic acids include adipic acid, phthalic acid, succinic acid, azelaic acid and sebacic acid. Examples of polyfunctional hydroxy compounds include glycols such as ethylene glycol, propylene glycol, butanediol and diethylene glycol, and polyhydric alcohols such as glycerol, trimethylol propane and pentaerythritol.

Polymer polyols can be obtained by mixing a polyether polyol and an ethylenically unsaturated monomer, and, when necessary, adding chain transfer agents, dispersion stabilizers and the like to bring about the radical polymerization of the ethylenically unsaturated monomer in the presence of a radical initiator. Examples of ethylenically unsaturated monomers include monomers containing cyano group such as acrylonitrile and methacrylonitrile; (meth) acrylic esters such as methyl (meth)acrylate, butyl (meth) acrylate, stearyl (meth)acrylate, hydroxyethyl (meth) acrylate, dimethylaminoethyl (meth)acrylate and dimethylaminopropyl (meth)acrylate; monomers containing carboxyl group such as acrylic acid, methacrylic acid, itaconic acid, maleic acid and fumaric acid; acid anhydride monomers such as maleic anhydride and itaconic anhydride; hydrocarbon compounds such as butadiene, isoprene and 1,4-pentadiene; aromatic hydrocarbon compounds such as styrene, α-methyl styrene, phenylstyrene and chlorostyrene; halogen-containing monomers such as vinyl chloride and vinylidene chloride; vinyl ethers such as vinyl ethyl ether and vinyl butyl ether; vinyl ketones such as vinyl ethyl ketone; vinyl esters such as vinyl acetate; acrylamides such as acrylamide, N,N-dimethylacrylamide, N-isopropylamide, N,N-dimethylaminopropyl acrylamide and methylene bisacrylamide; and methacrylamides such as N,N-dimethyl methacrylamide. Such ethylenically unsaturated monomers may be used alone or in combinations of two or more.

The aforementioned polyol components can be used alone or in combinations of two or more, depending on the properties required of the polyurethane foam that is to be prepared.

For example, a foamed product with high elasticity can be obtained when the aforementioned polyether polyol and polymer polyol are used in a proportion, based on the combined weight of the two, of 30 to 90 wt % of the former and 70 to 10 wt % of the latter, and preferably 40 to 80 wt % of the former and 60 to 20 wt % of the latter.

(ii) Polyisocyanate Component

Examples of polyisocyanate components which can be used include various polyisocyanate compounds having two or more isocyanate groups, which are heretofore used in polyurethane resin compositions. Examples of such polyisocyanate compounds include aromatic polyisocyanates, aliphatic polyisocyanates and alicyclic polyisocyanates, as well as mixtures of two or more of such polyisocyanates, and modified polyisocyanates obtained by the modification of such polyisocyanates. Specific examples of such polyisocyanate compounds include polyisocyanates such as tolylene diisocyanate, diphenylmethane diisocyanate, polymethylene polyphenylene polyisocyanate (crude MDI), xylylene diisocyanate, isophorone diisocyanate and hexamethylene diisocyanate; and modified products of such polyisocyanates, such as carbodiimide modified products, burette modified products, dimmers and trimers. Prepolymers with terminal isocyanate groups obtained from such polyisocyanates and active hydrogen-containing compounds can also be used.

It is especially preferred in the present invention to use, alone or in combination, tolylene diisocyanates, including isomers such as 2,4-tolylene diisocyanate, 2,6-tolylen diisocyanate and the like.

The amount in which the polyisocyanate component is used is not particularly limited, but is usually an amount resulting in an isocyanate index of about 90 to 120, preferably about 95 to 115, and even more preferably about 100 to 110.

(iii) Flame Retardant

The flame retardant is a halogen-free phosphate ester which meets the following conditions (a) to (d) and which contains at least one alcoholic hydroxyl group (sometimes referred to below as "reactive phosphate ester"):

(a) an acid value of 2 KOHmg/g or less, (b) a viscosity of 5 Pa·s or less at 25° C., (c) a hydroxyl value of 5 to 250 KOHmg/g, and (d) a weight average molecular weight of 200 to 2000.

The alcoholic hydroxyl group allows such phosphate esters to react with the polyisocyanate compound in the starting materials so as to be incorporated into the resin skeleton of the polyurethane foam, thus preventing them from being vaporized. The lack of halogen can prevent harmful effects on humans caused by the vaporization, the production of dioxins when burned, and the like.

The acid value of the phosphate ester is 2 KOHmg/g or less. A higher level of the acid value will result in the loss of catalytic activity during foaming, making it difficult to obtain foamed products. Although it would appear that the amount of catalyst could be increased to enhance the catalytic activity, this is economically disadvantageous and can also lead to foamed products with lower physical properties, and is therefore not preferred.

The phosphate ester has a viscosity of 5 Pa·s or less at 25° C. and preferably has a viscosity of 4 Pa·s or less at 25° C. A viscosity higher than that will impose a greater stirring load during the production of the foamed product, and will not allow the phosphate ester to be uniformly dispersed, which might adversely affect the properties of the resulting formed product.

The hydroxyl value of the phosphate ester is 250 KOHmg/g or less. A higher value will make it difficult to control the reaction, and will tend to result in the formation of closed cells, thus adversely affecting the properties such as the air permeability and compressive strain of the foamed product.

The weight average molecular weight of the phosphate ester is within the range of 200 to 2000. A molecular weight lower than this range will result in the vaporization of the phosphate ester by the heat of reaction before reaction with the isocyanate groups, resulting in lower flame retardant properties, and the foamed product will have coarsely formed cells. A molecular weight higher than the above range will result in a higher viscosity, and will thus impose a greater stirring load during the production of the foamed product, resulting in poor phosphate ester dispersion and foamed product with inferior properties.

Any phosphate ester meeting the above conditions can be used as the flame retardant in the present invention. Specific examples of such flame retardants include those represented by formula (I) to (IV) below.

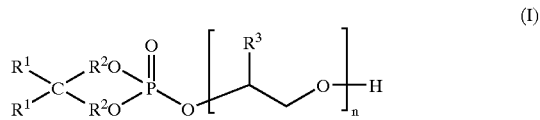

(wherein $R^1$ is a $C_1$ to $C_4$ alkyl group, $R^2$ is a $C_1$ to $C_3$ alkylene group, $R^3$ is a $C_1$ to $C_3$ alkyl group, and n is an integer of 1 to 10).

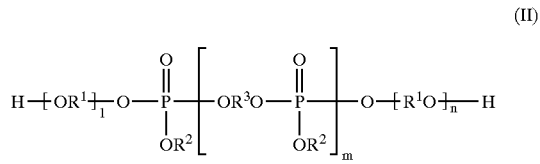

(wherein $R^1$ is a $C_2$ to $C_4$ alkylene group, $R^2$ is a $C_1$ to $C_4$ alkyl group, $R^3$ is a $C_1$ to $C_4$ alkylene group, l is an integer of 1 to 10, m is an integer of 1 to 10 and n is an integer of 1 to 10).

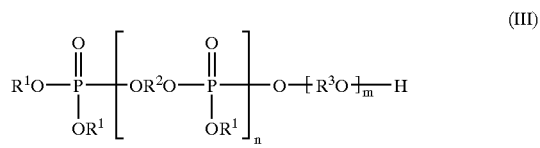

(wherein $R^1$ is a $C_1$ to $C_4$ alkyl group, $R^2$ is a $C_1$ to $C_4$ alkylene group, $R^3$ is a $C_2$ to $C_4$ alkylene group, m is an integer of 1 to 10, and n is an integer of 1 to 10).

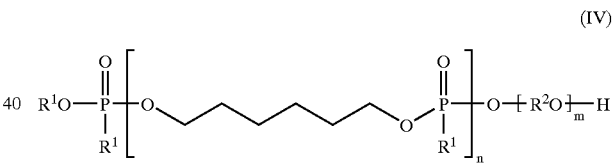

(wherein $R^1$ is a $C_1$ to $C_4$ alkyl group, $R^2$ is a $C_2$ to $C_4$ alkylene group, m is an integer of 1 to 10 and n is an integer of 1 to 10).

In the aforementioned general formulas, $C_1$ to $C_4$ alkyl groups are linear or branched alkyl groups with 1 to 4 carbon atoms, specific examples of which include methyl, ethyl, n-propyl, isopropyl, n-butyl, isobutyl, sec-butyl and tert-butyl. Examples of $C_1$ to $C_4$ alkylenes include linear methylenes such as methylene, ethylene, trimethylene and tetramethylene, and branched methylenes such as isopropylene and isobutylene.

The amounts of the aforementioned reactive phosphate esters to be used is determined according to the level of flame retardancy that is desired. An insufficient amount does not impart a satisfactory flame retardant effect. In contrast, an excessive amount may adversely affect the physical properties of the resulting foam. Generally, the amount of the reactive phosphate esters is preferably about 1 to about 20 parts by weight per 100 parts by weight of polyol component.

(iv) Tertiary Amine Carboxylate

It is necessary to use a tertiary amine carboxylate in the composition for polyurethane foam of the present invention. A salt of aliphatic tertiary amine with carboxylic acid is particularly preferred as the tertiary amine carboxylate.

Amine compounds are generally known to have catalytic activity in reactions between hydroxyl groups and isocyanate groups in polyisocyanate compounds. In the composition for polyurethane foam containing a reactive phosphate ester, components with hydroxyl groups include the reactive phosphate ester and the blowing agent in addition to the polyol, and thus the composition contains at least three types of components with hydroxyl groups. The use of ordinary amine catalyst or metal catalyst alone in such a composition does not result in the proper balance of reaction between the isocyanate groups and the three types of hydroxyl groups, and tends to produce compressive strain in the resulting foamed product.

In contrast, when a tertiary amine carboxylate is used as a catalyst, the reactions between the isocyanate groups and the three types of hydroxyl groups progress with a good balance, giving a foamed product with excellent physical properties.

Specific examples of tertiary amines for forming tertiary amine carboxylates-include aliphatic tertiary amines such as bis(2-dimethylaminoethyl) ether, N-methyl-N'-(2-dimethylaminoethyl) piperazine, N,N,N'N'-tetramethyl-1,6-hexamethylenediamine, N,N,N'N',N"-pentamethyl diethylenetriamine, N,N,N'N'-tetramethyl ethylenediamine, and 1,4-diazabicyclo-[2,2,2]-octane. Examples of carboxylic acids for forming salts with such tertiary amines include aliphatic monocarboxylic acids with about 1 to 8 carbon atoms, such as formic acid and acetic acid.

The amino groups of the tertiary amines in the tertiary amine carboxylates which can be used in the present invention are partially or completely neutralized by the carboxylic acid. The tertiary amine carboxylates can be used alone or in combinations of two or more.

The tertiary amine carboxylate is preferably used in an amount of about 0.01 to 0.3 part by weight per 100 parts by weight of polyol component. When the metal catalyst and ordinary amine catalyst described below are not used, the tertiary amine carboxylate is preferably used in an amount of about 0.02 to 0.3 part by weight per 100 parts by weight of polyol component to ensure sufficient catalytic action in producing the resin.

(v) Silicone Foam Stabilizer

Block copolymers of dimethylsiloxane and a polyether are usually used as silicone foam stabilizers, and can have various forms, such as linear, branched, or pendant form, but especially, branched or pendant copolymers are used in many cases. The silicone foam stabilizer used in the present invention is not particularly limited. Any silicone foam stabilizer heretofore used for flexible polyurethane foam may be used.

The use of silicone foam stabilizer provides effects such as preventing the coalescence of bubbles and stabilizing the cell films in addition to facilitating the mixing and emulsification of the starting materials and the dispersion of gases involved, thereby enabling foams with good properties to be obtained.

Although the amount of the silicone foam stabilizer to be used is not particularly limited, it is preferably about 0.5 to 2 parts by weight per 100 parts by weight of polyol component.

(vi) Blowing Agent

As the blowing agent in the composition for a polyurethane foam of the present invention, known blowing agents heretofore used in the compositions for flexible polyurethane foam are suitably selected according to the properties required of the foamed product.

Water is a typical example of such a blowing agent, and other examples include methylene chloride, n-butane, isobutane, n-pentane, isopentane, dimethyl ether, acetone, $CO_2$, etc. Depending on desired density and other properties of the foamed product, such blowing agents can be used alone or in combinations of two or more in the manner known in the art.

The amount of the blowing agent to be used is not particularly limited, but the amount ordinarily ranges from about 0.1 to 40 parts by weight per 100 parts by weight of polyol component.

Other Components (a) Catalyst

The tertiary amine carboxylate used in the composition of the present invention has catalytic activity in the reaction between the hydroxyl groups and the isocyanate groups, but has relatively low catalytic activity in the reaction between the polyisocyanate component and polyol component, that is, the resinification reaction. Known catalyst components can therefore also be used, when necessary, to promote the resinification reaction in cases of low reactivity between the polyol component and polyisocyanate component. Such catalysts include ordinary amine catalysts and metal catalysts.

Examples of ordinary amine catalysts include tertiary amine compounds which do not form salts with carboxylic acids, and can usually be used in an amount of about 0.01 to 0.1 part by weight per 100 parts by weight of polyol component. Such ordinary amine catalysts are preferably used in an amount such that the total amount with the aforementioned tertiary amine carboxylates is within the range of about 0.02 to 0.3 part by weight per 100 parts by weight of polyol component.

Metal catalysts are typically organometallic compounds containing metal component such as tin, copper, lead, zinc, cobalt or nickel. Tin catalysts such as dibutyl tin dilaurate and stannous octoate show particularly good catalytic activity.

Metal catalyst is preferably used in an amount ranging between about 0.01 and 1 part by weight per 100 parts by weight of polyol component.

The use of the metal catalyst within the aforementioned range, together with a amine catalyst such as the tertiary amine carboxylate or a mixture of the tertiary amine carboxylate and the ordinary amine catalyst, can allow the resinification and foaming reaction to progress with a good balance.

(b) Flame Retardant

Phosphate esters with no reactive functional group (additive type of phosphate ester) may also be added, if needed, as flame retardants to the composition for polyurethane foam of the present invention, provided that the foamed product is not thereby adversely affected.

Examples of such additive types of phosphate esters include oligomer types of phosphate esters, such as resorcinol bis(diphenylphosphate), bisphenol A bis (diphenylphosphate), resorcinol bis(bis(2,6-dimethylphenyl)phosphate), hydroquinone bis(bis(2,6-dimethylphenyl)phosphate) and biphenol bis(bis(2,6-dimethylphenyl)phosphate); and monomer types of phosphate esters, such as triphenyl phosphate, naphthyl diphenyl phosphate, dinaphthylphenyl phosphate, tricresyl phosphate, tributoxyethyl phosphate and diphenyl-2-ethylhexyl phosphate.

Additive types of phosphate esters are preferably used in an amount of about 40 parts by weight or less, and more preferably about 0.1 to 30 parts by weight, per 100 parts by weight of polyol component.

The aforementioned additive types of phosphate esters are preferably halogen-free oligomer types of phosphate esters for the sake of preventing fogging and adverse effects on humans.

It is effective to use low-viscosity additive types of phosphate esters together with reactive phosphate esters in order to lower the viscosity of the polyurethane composition as a whole and improve the workability, so as to give foamed product with better physical properties.

(c) Other Components

Additives such as colorants, crosslinkers, antioxidants, UV absorbents, agents for preventing hydrolysis, fillers and the like can also be added, if needed, to the composition for polyurethane foam of the present invention. The type and amount of such additives are not particularly limited. Commonly used additives can be used in the normally used range.

Method for Producing Foamed Product

Polyurethane foam can be produced from the composition for polyurethane foam of the present invention according to methods usually employed in the art. The polyurethane foam can be obtained, for example, by one-shot methods in which the polyol component, water, catalyst, flame retardant, foam stabilizer and the like are simultaneously mixed with the polyisocyanate component to bring about foaming through their reaction; prepolymer methods in which a portion of the polyol component is reacted with all of the polyisocyanate component, and the other components are mixed with the resulting prepolymer to bring about a reaction; and other methods. In these methods, the catalyst is usually pre-mixed with the polyol component for use in the form of a homogenous solution or dispersion.

The composition for flame-retardant flexible polyurethane foam of the present invention results in flexible polyurethane foam that has satisfactory flame retardant properties, as well as outstanding characteristics such as good heat resistance, excellent resistance to fogging and scorch, and extremely low compressive strain. Such flame-retardant flexible polyurethane foam can be effectively used, for example, in automobile seats or furniture such as sofas and beds.

BEST MODE FOR CARRYING OUT THE INVENTION

The invention is illustrated in further detail with reference to the following examples.

EXAMPLES 1 to 5 AND COMPARATIVE EXAMPLES 1 to 4

Flexible polyurethane foams were produced by the following one-shot method using the compositions having the formulations shown in Tables 1 and 2.

First, all components except for the polyisocyanate component were blended in the predetermined proportions, and were uniformly kneaded by being stirred at 3000 rpm for 1 minute in a stirring device. The polyisocyanate component was added, the mixture was stirred for another 5 to 7 seconds at 3000 rpm, and the mixture was quickly poured into cardboard boxes with a square cross section.

Foaming took place immediately and maximum volume was reached after a few minutes. The mixture was cured for another 15 minutes in an oven at 80° C. The resulting foamed product was a flexible white polyurethane foam with open cells.

The symbols in Tables 1 and 2 indicate the following components.

1. Polyol Component (1) MN-3050

Trifunctional propylene-based polyether polyol (number average molecular weight: 3000; hydroxyl value: 56.0 KOHmg/g) (tradename: MN-3050 ONE, by Mitsui Takeda Chemicals Inc.)

2. Reactive Phosphate Ester Flame Retardant (1) TF-J12

Phosphate ester represented by following formula and having the following properties (by Daihachi Chemical Industry Co., Ltd.)

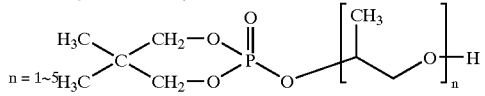

hydroxyl value: 225 KOHmg/g acid value: 0.08 KOHmg/g viscosity (25° C.): 4.0 Pa·s weight average molecular weight: 243

(2) Exolit OP-550

Phosphate ester with hydroxyalkyl groups having the following properties (tradename: Exolit OP-550, by Clariant Corporation)

phosphorus content: 17.0% hydroxyl value: 130 KOHmg/g acid value: 1.3 KOHmg/g viscosity (25° C.): 2.1 Pa·s weight average molecular weight: 863

(3) Fyrol-PNX

Phosphate ester with hydroxyalkyl groups having the following properties (tradename: Fyrol-PNX, by Akuzo Nobel Chemicals Co., Ltd.)

phosphorus content: 19.0% hydroxyl value: 20 KOHmg/g acid value: 1.5 KOHmg/g viscosity (25° C.): 2.0 Pa·s weight average molecular weight: 945

3. Additive-Type Phosphate Ester Flame Retardant (Halogen-Free Phosphate Esters)

3.1 Oligomer Type (1) CR-733S

Resorcinol bis (diphenylphosphate) (tradename: CR-733S, by Daihachi Chemical Industry Co., Ltd.)

3.2 Monomer Type (1) TBXP

Tributoxyethyl phosphate (tradename: TBXP, by Daihachi Chemical Industry Co., Ltd.)

4. Polyisocyanate Component (1) T-80

Tolylene diisocyanate (2,4-/2,6-isomer ratio=80/20) (tradename: Cosmonate T-80, by Mitsui Takeda Chemicals Inc.)

5. Catalyst 5.1 Tertiary Amine Carboxylate (1) TOYOCAT-ETF

Salt of Bis(2-dimethylaminoethyl) ether with acetic acid (tradename: TOYOCAT-ETF, by Tosoh Corporation)

5.2 Ordinary Amine Catalyst (1) TOYOCAT-ET

Bis(2-dimethylaminoethyl) ether (tradename: TOYOCAT-ET, by Tosoh Corporation)

(2) TEDA-L33

1,4-diazabicyclo-[2,2,2]-octane (33% dipropylene glycol solution (tradename: TEDA-L33, by Tosoh corporation)

5.3 Tin Catalyst (1) DABCO T

Stannous octoate (tradename: DABCO T, by Sankyo Air Products Co., Ltd.)

6. Silicone Foam Stabilizer (1) L-580

(tradename: L-580, by Nippon Unicar Co., Ltd.)

(2) L-688
  (tradename: L-688, by Witco Corporation)
(3) SZ-1136
  (tradename: SZ-1136, by Nippon Unicar Co., Ltd.)

Samples were cut out from the polyurethane foams obtained in the manner described above, and the properties were measured by the following test methods. The results are given along with the components and their proportions in Tables 1 and 2.

(1) Flammability Test
  Test method: based on FMVSS-302
  Foam piece: length 250 mm, width 70 mm
  Foam thickness: 13 mm
  Evaluated by the following basis:
  NB: no burning; SE: self-extinguishing;
  BN: burning
(2) Compression Strain
  Test method: based on JIS K-6382
  Foam piece: length 6 cm, width 6 cm, thickness 5 cm The surface of 6 cm×6 cm foam pieces was compressed to 50% thickness for 22 hours at 70° C., the pressure was released, the foam thickness was then measured, and the percentage of the reduction in thickness relative to the thickness before compression was evaluated as the compression strain. For example, if the thickness returned to 4 cm, the compression strain is (1-4/5)×100=20%.

(3) Scorch Test

Samples were treated for 3 minutes in a microwave oven (500 W) and then heated for 2 hours at 140° C. The change in the color (scorching) of the test pieces at that time was determined on the basis of the following scale by measuring the yellow index (YI) with a calorimeter.
  A: YI 30 or less (no change in color)
  B: YI 31 to 50 (slight change in color)
  C: YI 51 to 70 (color changed)
  D: YI 71 or more (considerable change in color)

TABLE 1

|  |  |  | Examples | | | | |
|---|---|---|---|---|---|---|---|
|  |  |  | 1 | 2 | 3 | 4 | 5 |
| Amounts (weight parts) | Polyol Component | MN-3050 | 100 | 100 | 100 | 100 | 100 |
|  | Tertiary amine carboxlate catalyst | TOYOCAT-ETF | 0.3 | 0.2 | 0.2 | 0.2 | 0.2 |
|  | Ordinary amine catalyst | TOYOCAT-EF |  |  |  | 0.1 |  |
|  |  | TEDA-L33 |  | 0.1 | 0.1 |  | 0.1 |
|  | Tin catalyst | DABCO T | 0.25 | 0.25 | 0.25 | 0.25 | 0.25 |
|  | Water |  | 2.5 | 4.5 | 4.5 | 4.5 | 4.5 |
|  | Methylene chloride |  |  | 3 | 5 | 3 | 3 |
|  | Reactive phosphate ester flame retardant | TF-J12 | 2 | 5 | 15 |  |  |
|  |  | Exolit OP-550 |  |  |  | 10 |  |
|  |  | Fyrol-PNX |  |  |  |  | 10 |
|  | Additive-type phosphate ester flame retardant | CR-733S |  |  | 15 |  |  |
|  |  | TBXP |  |  |  | 5 |  |
|  | Silicone foam stabilizer | SZ-1136 |  | 1 |  | 1 |  |
|  |  | L-688 |  |  | 1 |  |  |
|  |  | L-580 | 1 |  |  |  | 1 |
|  | Polyisocyanate Component | T-80 | 38.5 | 54.1 | 56.2 | 55.1 | 53.3 |
| Properties | Flammability test |  | SE | NB | NB | NB | SE |
|  | Compression strain (%) |  | 4.2 | 5.3 | 7.4 | 8.2 | 9.3 |
|  | Scorching property |  | A | A | A | B | B |

TABLE 2

|  |  |  | Comparative example | | | |
|---|---|---|---|---|---|---|
|  |  |  | 1 | 2 | 3 | 4 |
| Amounts (weight parts) | Polyol Component | MN-3050 | 100 | 100 | 100 | 100 |
|  | Tertiary amine carboxylate catalyst | TOYOCAT-ETF |  |  |  |  |
|  | Ordinary amine catalyst | TOYOCAT-EF |  |  |  |  |
|  |  | TEDA-L33 | 0.3 | 0.3 | 0.2 | 0.2 |
|  | Tin catalyst | DABCO T | 0.25 | 0.25 | 0.25 | 0.25 |
|  | Water |  | 4.5 | 2.5 | 4.5 | 4.5 |
|  | Methylene chloride |  | 3 |  | 3 | 3 |
|  | Reactive phosphate ester flame retardant | TF-J12 | 7.5 | 2 |  |  |
|  |  | Exolit OP-550 |  |  | 10 |  |
|  |  | Fyrol-PNX |  |  |  | 10 |
|  | Additive-type phosphate ester flame retardant | CR-733S |  |  |  |  |
|  |  | TBXP | 2.5 |  |  |  |
|  | Silicone foam stabilizer | SZ-1136 |  |  |  |  |
|  |  | L-688 |  |  |  |  |
|  |  | L-580 | 1 | 1 | 1 | 1 |
|  | Polyisocyanate Component | T-80 | 55.1 | 38.5 | 55.1 | 55.1 |

TABLE 2-continued

| | | Comparative example | | | |
|---|---|---|---|---|---|
| | | 1 | 2 | 3 | 4 |
| Properties | Flammability test | NB | SE | NB | NB |
| | Compression strain (%) | 33.0 | 12.0 | 43.0 | 45.0 |
| | Scorching property | B | A | C | C |

The above results clearly show that the composition for flame-retardant flexible polyurethane foam of the present invention, which contained a reactive phosphate ester flame retardant and a tertiary amine carboxylate, resulted in foamed products with excellent properties, i.e. good flame retardant properties, no scorching and extremely low compression strain.

In contrast, the compositions of Comparative Examples 1 to 4, which contained no tertiary amine carboxylates but only reactive phosphate ester flame retardants, resulted in foamed product with low commercial value due to high compression strain and occasional scorching.

What is claimed is:

1. A composition for flame-retardant flexible polyurethane foam comprising:
   (i) a polyol component;
   (ii) a polyisocyanate component;
   (iii) a halogen-free phosphate ester that meets the following conditions (a) to (d), and that contains at least one alcoholic hydroxyl group;
      (a) an acid value of 2 KOHmg/g or less,
      (b) a viscosity of 5 Pa·s or less at 25° C.,
      (c) a hydroxyl value of 5 to 250 KOHmg/g, and
      (d) a weight average molecular weight of 200 to 2000;
   (iv) a tertiary amine carboxylate;
   (v) a silicone foam stabilizer; and
   (vi) a blowing agent.

2. The composition according to claim 1, which comprises 1 to 20 parts by weight of the phosphate ester specified in item (iii), 0.01 to 0.3 part by weight of the tertiary amine carboxylate, 0.5 to 2 parts by weight of the silicone foam stabilizer and 0.1 to 40 parts by weight of the blowing agent, per 100 parts by weight of the polyol component.

3. The composition according to claim 1, wherein the tertiary amine carboxylate is a salt of aliphatic tertiary amine with carboxylic acid.

4. The composition according to claim 1, wherein the phosphate ester specified in item (iii) is a compound represented by the following formula (I):

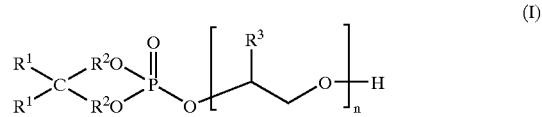

wherein $R^1$ is a $C_1$ to $C_4$ alkyl group, $R^2$ is a $C_1$ to $C_3$ alkyl group $R^3$ is a $C_1$ to $C_3$ alkyl group and n is an integer of 1 to 10.

5. The composition according to claim 2, wherein the tertiary amine carboxylate is a salt of aliphatic tertiary amine with carboxylic acid.

6. The composition according to claim 2, wherein the phosphate ester specified in item (iii) is a compound represented by the following formula (I):

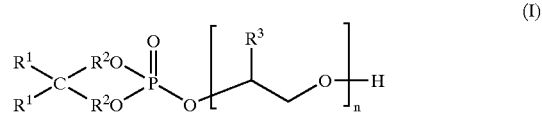

wherein $R^1$ is a $C_1$ to $C_4$ alkyl group, $R^2$ is a $C_1$ to $C_3$ alkylene group, $R^3$ is a $C_1$ to $C_3$ alkyl group and n is an integer of 1 to 10.

7. The composition according to claim 3, wherein the phosphate ester specified in item (iii) is a compound represented by the following formula (I):

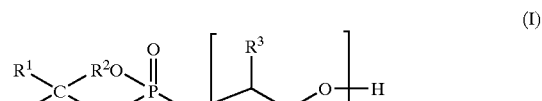

wherein $R^1$ is a $C_1$ to $C_4$ alkyl group, $R^2$ is a $C_1$ to $C_3$ alkylene group, $R^3$ is a $C_1$ to $C_3$ alkyl group and n is an integer of1 to 10.

* * * * *

UNITED STATES PATENT AND TRADEMARK OFFICE
CERTIFICATE OF CORRECTION

PATENT NO.     : 6,861,452 B2
DATED          : March 1, 2005
INVENTOR(S)    : Noriaki Tokuyasu and Katsumi Kameda It is certified that error appears in the above-identified patent and that said Letters Patent is hereby corrected as shown below:

<u>Title page,</u>
Item [73], Assignee, please delete "Daichi Chemical Industry Co., Ltd.," and insert therefore, -- Daihachi Chemical Industry Co., Ltd. --.

Signed and Sealed this

Seventh Day of June, 2005

JON W. DUDAS
*Director of the United States Patent and Trademark Office*